United States Patent [19]

Pagniez et al.

[11] Patent Number: 4,902,490
[45] Date of Patent: Feb. 20, 1990

[54] ESSENTIALLY PURE/COLORLESS $P_2NOCL_5$

[75] Inventors: Guy Pagniez, Poey de Lescar; Philippe Potin, Billere, both of France

[73] Assignee: Atochem, Puteaux, France

[21] Appl. No.: 166,367

[22] Filed: Mar. 10, 1988

[30] Foreign Application Priority Data

Mar. 10, 1987 [FR] France .................................. 87 03251

[51] Int. Cl.$^4$ ............................................. C01B 25/10
[52] U.S. Cl. .................................... 423/300; 423/302; 423/304; 423/386; 423/462
[58] Field of Search ............... 423/300, 302, 304, 386, 423/462

[56] References Cited

U.S. PATENT DOCUMENTS 1,356,878 10/1920 Newton .................................. 203/89
2,925,320 2/1960 Kahler .................................. 423/302
3,231,327 1/1966 Seglin et al. .......................... 423/302

FOREIGN PATENT DOCUMENTS 580958 8/1959 Canada .................................. 423/300
2117055 1/1973 Fed. Rep. of Germany ...... 423/300
3144751 5/1983 Fed. Rep. of Germany ...... 423/300

*Primary Examiner*—Robert L. Stoll
*Attorney, Agent, or Firm*—Burns, Doane, Swecker & Mathis

[57] ABSTRACT

Essentially pure and colorless N-(dichlorophosphoryl)-trichlorophosphazene [$P_2NOCl_5$] is prepared/purified under relatively moderate conditions, by reacting phosphorous pentachloride with ammonium chloride, treating the resulting medium of reaction, containing $P_3NCl_{12}$, with $SO_2$, and thin film evaporating the medium of reaction, advantageously in two stages, to eliminate $SO_2$, $POCl_3$ and $SOCl_2$ values therefrom.

4 Claims, No Drawings

ESSENTIALLY PURE/COLORLESS P$_2$NOCL$_5$

CROSS-REFERENCE TO COMPANION APPLICATIONS

Copending applications, Ser. No. 119,195, filed Nov. 12, 1987, and Ser. No. 166,270, now U.S. Pat. No. 4,812,297, filed concurrently herewith and assigned to the assignee hereof. Cf. copending applications Ser. No. 166,368, now U.S. Pat. No. 4,824,648, and Ser. No. 166,369, now U.S. Pat. No. 4,810,480, both also filed concurrently herewith and assigned to the assignee hereof.

BACKGROUND OF THE INVENTION

1. Field of the Invention:

The present invention relates to the preparation of N-(dichlorophosphoryl)trichlorophosphazene and, more especially, to the preparation of N-(dichlorophosphoryl)trichlorophosphazene that is essentially pure and colorless.

2. Description of the Prior Art:

U.S. Pat. No. 3,231,327 describes the preparation of N-(dichlorophosphoryl)trichlorophosphazene having the formula:

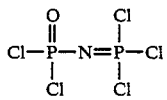

or, more simply, P$_2$NOCl$_5$.

According to this '327 patent, P$_3$NCl$_{12}$ is initially prepared by the following simplified reaction scheme:

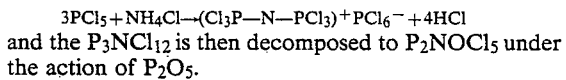

and the P$_3$NCl$_{12}$ is then decomposed to P$_2$NOCl$_5$ under the action of P$_2$O$_5$.

In French application No. 86/15684, it is proposed to treat the reaction medium containing P$_3$NCl$_{12}$ with SO$_2$. The described method comprises the decomposition of P$_3$NCl$_{12}$ with SO$_2$ at a low temperature (at most 30° C.), in order to provide, after distillation, a final product (P$_2$NOCl$_5$) devoid of yellow discoloration, as the impurities which impart such discoloration interfere with the subsequent polycondensation of P$_2$NOCl$_5$ to polychlorophosphazene.

This particular operation, which is carried out at a low temperature to prevent discoloration due to the presence of SO$_2$, results in the evaporation of SOCl$_2$ and POCl$_3$ while maintaining the same temperature. Such low temperature evaporation makes it necessary to conduct the operation under a high vacuum (pressure reduced to 1 torr, for example), and to condense the vapors of SOCl$_2$ and POCl$_3$ at a very low temperature, on the order of −80° C.

SUMMARY OF THE INVENTION

Accordingly, a major object of the present invention is the provision of an improved process for the preparation of N-(dichlorophosphoryl)trichlorophosphazene [P$_2$NOCl$_5$], and wherein the final product P$_2$NOCl$_5$ is both essentially pure and colorless.

Briefly, the present invention features reacting phosphorus pentachloride with ammonium chloride, next treating the resulting medium of reaction, containing P$_3$NCl$_{12}$, with SO$_2$, said medium of reaction being maintained at a temperature at least equal to approximately 30° C., eliminating the SO$_2$, POCl$_3$ and SOCl$_2$ values from said reaction medium by passing same through a thin film evaporator, and ultimately distilling the crude P$_2$NOCl$_5$ product.

DETAILED DESCRIPTION OF THE PREFERRED EMBODIMENTS OF THE INVENTION

More particularly according to the present invention, the thin film evaporation of the reaction medium resulting after the SO$_2$ treatment, conducted in two stages, permits the successive elimination of the residual SO$_2$ and potentially a fraction of the SOCl$_2$ on the one hand, and the entirety or the residual SOCl$_2$ and the POCl$_3$ on the other.

In such process, the first stage is advantageously carried out in conventional thin film evaporator employing a wall temperature of from 20° to 80° C. and an absolute pressure of 5 to 30 torrs. The flow rate of the reaction mixture introduced into the thin film evaporator may range from 20 to 150 kg.hr$^{-1}$.m$^{-2}$, with the proviso that these values represent orders of magnitude and that the values of the flow rate, temperature and pressure are interrelated.

Over the course of this first stage, all of the SO$_2$ is eliminated. A fraction of SOCl$_2$ may also be eliminated, but the vapors may easily be condensed at a temperature that is always higher than −40° C.

After issuing from the first stage, the reaction mixture is again introduced into a thin film evaporator under conditions which permit the quasi/total elimination of the SOCl$_2$ and POCl$_3$. For this purpose, the wall temperature advantageously ranges from 100° to 180° C. and preferably from 120° to 140° C., with the absolute pressure ranging from 5 to 20 torrs. The flow rates given above are applicable also in this second stage, as is the proviso concerning the flow rate/temperature/pressure relationship. For example, a pressure of 5 to 7 torrs makes it possible to avoid heating to elevated temperatures, and suffices if it is possible to condense the vapors at −30° C.

The thin film evaporators that may be used in the process according to the present invention are per se well known to this art. One example of an apparatus of this type, given merely as an illustration, consists of an externally heated column, wherein a center shaft equipped with scrapers distributes the product to be evaporated in the form of a thin film over the hot wall member of said column.

Similarly, the precise conditions for the preparation of the reaction medium containing P$_3$NCl$_{12}$, and in particular the conditions for reacting the PCl$_5$ with the NH$_4$Cl, the treatment with SO$_2$ and the distillation of the crude P$_2$NOCl$_5$ are also known to this art, and are described in the aforenoted French application No. 86/15684, hereby expressly incorporated by reference.

The process of the invention thus enables the more facile production of essentially pure and colorless N-(dichlorophosphoryl)trichlorophosphazene under moderate conditions of purification, i.e., the elimination of SO$_2$, SOCl$_2$ and POCl$_3$.

In order to further illustrate the present invention and the advantages thereof, the following specific example is given, it being understood that same is intended only as illustrative and in nowise limitative.

EXAMPLE:

The following reagents were successively introduced into a reactor:

(i) 17.128 kg (82.15 moles) $PCl_5$;
(ii) 1.383 kg (25.85 moles) $NH_4Cl$;
(iii) 18.651 kg $POCl_3$.

The mixture was heated to the reflux temperature of the solvent and maintained under agitation at this temperature for 2 hr.

Subsequently, 3.892 kg (60.81 moles) $SO_2$ (excess of 8.02%) were added to the medium of reaction over 300 min, while maintaining the temperature above 20° C.

The perfectly colorless reaction mixture was transferred into a thin film evaporator containing a vertical glass column, heated externally and equipped on the inside with a center shaft carrying scrapers. By its rotation, this scraper system distributed the solution to be evaporated in the form of a thin film. The surface area of the hot wall amounted to 0.1 $m^2$ The vacuum was generated by a liquid ring pump equipped with an ejector and operating with a 15% sodium hydroxide solution to neutralize the evaporated $SO_2$ and the noncondensable acids that may be present.

The control parameters of this assembly were as follows:

(a) Speed of rotation of scraper system=800 rpm
(b) Temperature of the hot wall=60° C.
(c) Absolute pressure=15 torr
(d) Temperature of the vapor condenser=−20° C.
(e) flow rate of the reaction medium=5 kg/hr.

During the first pass, at the outlet of the condenser 288.64 kg of $SO_2$ and 2,110 g $SOCl_2$ were collected, which amounted to 32.4% of the quantity contained in the reaction mixture. The solution recovered at the base of the evaporator column was perfectly colorless.

This solution was recycled into the column, observing the following control parameters:

(a) Speed of rotation of scraper system=800 rpm
(b) Temperature of the hot wall=120° C.
(c) Absolute pressure=7 torr
(d) Temperature of the vapor condenser=−25° C.
(e) Flow rate of the solution=7.5 kg/hr.

At the base of the evaporator column, 7.179 kg of crude, colorless $P_2NOCl_5$ containing only 3% $POCl_3$, were recovered.

This crude product was distilled under the following conditions:

(1) Temperature of the heating fluid=130° C.
(2) Temperature of the boiler=115° C.
(3) Head temperature=87° C.
(4) Pressure=0.5 torr The operation was carried out with a reflux rate of 5 during the first 5% of distillation and a reflux rate of 1 until the $P_2NOCl_5$ vapors ceased. The total distillate represented 92.7% of the mass introduced into the boiler, amounting to 87.55% with respect to the initial $PCl_5$.

The first 5% had a slightly yellow tint. The remainder of the distillate was perfectly colorless and remained so after a storage time of two weeks under nitrogen.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of N-(dichlorophosphoryl)trichlorophosphazene ($P_2NOCl_5$), comprising (i) reacting phosphorus pentachloride with ammonium chloride in the presence of $POCl_3$, (ii) treating the resulting medium of reaction, containing $P_3Cl_{12}$, with $SO_2$ to obtain $P_2NOCl_5$ and $SOCl_2$, and (iii) thin film evaporating said medium of reaction to eliminate $SO_2$, $POCl_3$ and $SOCl_2$ values therefrom.

2. The process as defined by claim 1, comprising conducting said thin film evaporation (iii) in two stages, whereby successively first eliminating residual $SO_2$ values, and then the $SOCl_2$ and $POCl_3$ values.

3. The process as defined by claim 2, said first stage being carried out at a temperature of from 20° to 80° C., under an absolute pressure of from 5 to 20 torrs and at a flow rate of from 20 to 150 $kg.hr^{-1} m^{-2}$.

4. The process as defined by claim 3, said second stage being carried out at a temperature of from 100° to 180° C., under an absolute pressure of from 5 to 20 torrs and at a flow rate of from 20 to 150 $kg.hr^{-1}.m^{-2}$.

* * * * *